United States Patent [19]

Diemer et al.

[11] Patent Number: 4,559,210

[45] Date of Patent: Dec. 17, 1985

[54] MULTI-STAGE METHOD FOR WASHING-OUT AMMONIA FROM GAS, PARTICULARLY COKING OVEN GAS

[75] Inventors: Peter Diemer; Hans J. Wohner, both of Essen, Fed. Rep. of Germany

[73] Assignee: Krupp Koppers GmbH, Essen, Fed. Rep. of Germany

[21] Appl. No.: 580,542

[22] Filed: Feb. 15, 1984

[30] Foreign Application Priority Data

Feb. 25, 1983 [DE] Fed. Rep. of Germany ....... 3306664

[51] Int. Cl.$^4$ .......................... C01C 3/00; C02F 3/12; B01D 3/38
[52] U.S. Cl. ................................... 423/237; 210/712; 210/750
[58] Field of Search ................... 423/235, 235 D, 237, 423/239, 239 A; 210/712, 718, 750, 765

[56] References Cited

U.S. PATENT DOCUMENTS 3,540,189 11/1970 Siewers et al. ....................... 423/237
4,311,597 1/1982 Bhattacharyya .................... 210/750

FOREIGN PATENT DOCUMENTS 855452 7/1949 Fed. Rep. of Germany .
1055572 1/1967 United Kingdom ................ 423/237
2080274 2/1982 United Kingdom ................ 423/237

Primary Examiner—Gregory A. Heller
Attorney, Agent, or Firm—Michael J. Striker

[57] ABSTRACT

In a multi-stage washing process for the removal of ammonia from coking oven gas, a portion of waste water, produced during the separation of ammonia from ammonia-containing water in an ammonia still, is supplied to an ammonia water at the final stage of washing, at which ammonia is washed out from gas with ammonia-free water.

5 Claims, 2 Drawing Figures

MULTI-STAGE METHOD FOR WASHING-OUT AMMONIA FROM GAS, PARTICULARLY COKING OVEN GAS

BACKGROUND OF THE INVENTION

The present invention pertains to methods of multi-stage or two-stage washing-out of ammonia from gas, particularly from coking oven gas.

Multi-stage or two-stage methods for the removal of ammonia from coking oven gas have been known in the art. One of the known methods of the type under discussion includes the steps of washing or scrubbing coking oven gas with water enriched with ammonia at one stage of the method and washing that gas with ammonia-free water at another stage.

It is known from so-called indirect method for collecting ammonia from coking oven gas that ammonia contained in gas in conjunction with gas cooling is washed out from the gas at the first or second stage of the ammonia removal process by means of water enriched with ammonia utilized as a washing medium. This water enriched with ammonia utilized at the first stage of the process can be further again used at the following washing stages, furthermore, ammonia-containing condenser or cooler condensate freed from tar can be also utilized. The residuals of ammonia are then washed out with ammonia-free water at the last stage of the washing process unless gas contains only about 2 g of $NH_3$ per 100 $m_n^3$. A suitable softened fresh water is normally utilized at that last washing stage. By processing water in an ion exchanger device calcium and magnesium ions acting as hardening constituents are substituted by sodium ions to obtain soft fresh water. This water softening process, however is costly and therefore undesired.

German Patent Publication DE-PS No. 855,452 discloses a method for the removal of ammonia from coking oven gas, in which a non-softened fresh water is used as a washing medium at the last washing stage. This known method provides that washing water containing the residuals of ammonia and obtained from the last stage of the washing process, is processed through a reaction space (settling tank) for a longer period of time to permit the separation of alkaline-earth carbonate and thereby at least a partial softening of water. This partially softened water must be then also supplied to the systems for another use, for example to a cold water circuit. This known process has not been used in practice for various reasons. On the one hand, the softening of washing water obtained in the known method is incomplete and takes a relatively long period of time whereby the utilization of such softened ammonia-containing water is limited. On the other hand, this known method appears to be necessary to decrease ammonia output because ammonia washed out from gas at the last stage of the washing process is in this case lost with washing water.

SUMMARY OF THE INVENTION

It is an object of this invention to provide an improved method for the removal of ammonia from coking oven gas.

It is a further object of the present invention to provide a method, in which the utilization of softened fresh water at the last stage of the washing process is no longer necessary and in which losses of ammonia washed out from gas at this last stage would not be permitted.

It is still another object of the invention to substantially decrease water consumption for washing out of ammonia from coking oven gas as well as consumption of the waste water supplied to the ammonia still.

These and other objects of the invention are attained by a multi-stage method for washing out ammonia from gas, particularly coking oven gas, including the steps of washing out ammonia from gas with water enriched with ammonia in an ammonia washer at at least one wash stage and washing-out ammonia from the gas with ammonia-free water at a final wash stage in the ammonia washer, providing an ammonia still and supplying an ammonia-containing water produced at said at least one wash stage in said ammonia washer to said ammonia still, separating ammonia vapor from waste water in said ammonia still under action of water steam supplied to said ammonia still, and discharging waste water from said ammonia still, branching off a partial stream of waste water from the waste water discharged from said ammonia still and supplying said partial stream at said final wash stage to said ammonia washer, said partial stream containing some free ammonia, being neutralized by the addition thereto of acids before said stream is supplied to said ammonia washer.

The invention is based on the knowledge that waste water discharged from the ammonia still should be subjected to biological cleaning before this water is led to a canal system so that calcium and magnesium ions acting as hardening components be eliminated from water. This waste water still contains about 100 mg/l of free ammonia. Since free ammonia in ammonia-containing water is disturbing it should be removed from water in a suitable fashion. The present invention provides that free ammonia in the stream of waste water supplied back to the ammonia washer is removed from water due to the addition to that stream of acids whereby ammonia salts are produced in that water.

A sulfuric acid can be utilized for neutralization of waste water. Ammonia salts produced during the neutralization of free ammonia remain in the partial stream of waste water recycled to the ammonia washer. An undesired enrichment of ammonia salts, which can occur in circulation of waste water, is avoided due to the present invention because a mixture of the partial stream of waste water with gas condensate is obtained in the ammonia washer and ammonia salts contained in that partial stream are then disintegrated in the ammonia still. This disintegration is preferably obtained due to caustic soda solution which is added into the ammonia still.

The caustic soda solution can be supplied directly into the ammonia still or it can be first fed into the ammonia washer. An additional cleaning effect of the coking oven gas takes place in the ammonia washer. Then hydrogen sulfide and carbon dioxide contained in coking oven gas will be at least partially converted into sodium sulfide and sodium carbonate by means of the added caustic soda solution. This alkali solution is then removed from the upper portion of the ammonia washer and fed to the ammonia still. The quantity of the added caustic soda solution must be, of course, measured in each instant so that this quantity be sufficient to free all ammonia in the ammonia still. This means that not only the bound ammonia, which derives from the waste water-partial stream supplied to the ammonia washer, but also the bound ammonia, which is contained in water enriched with ammonia may be supplied in the form of condenser-and-cooler condensate at the first or one of the initial stages of the washing process is removed from gas.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
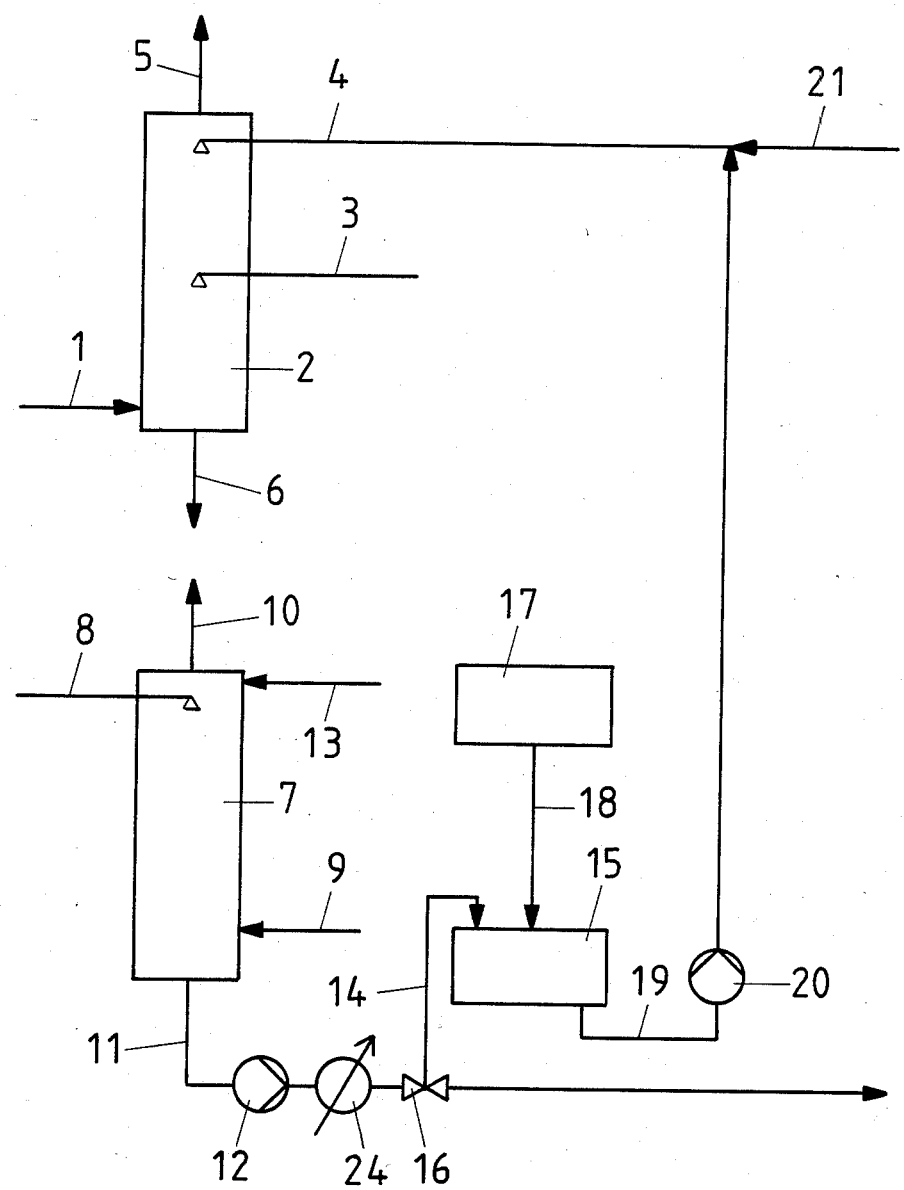
FIG. 1 is a diagram illustrating the inventive method of washing out ammonia from coking oven gas, in which a required caustic soda solution is fed directly to an ammonia still.
Figure 2:
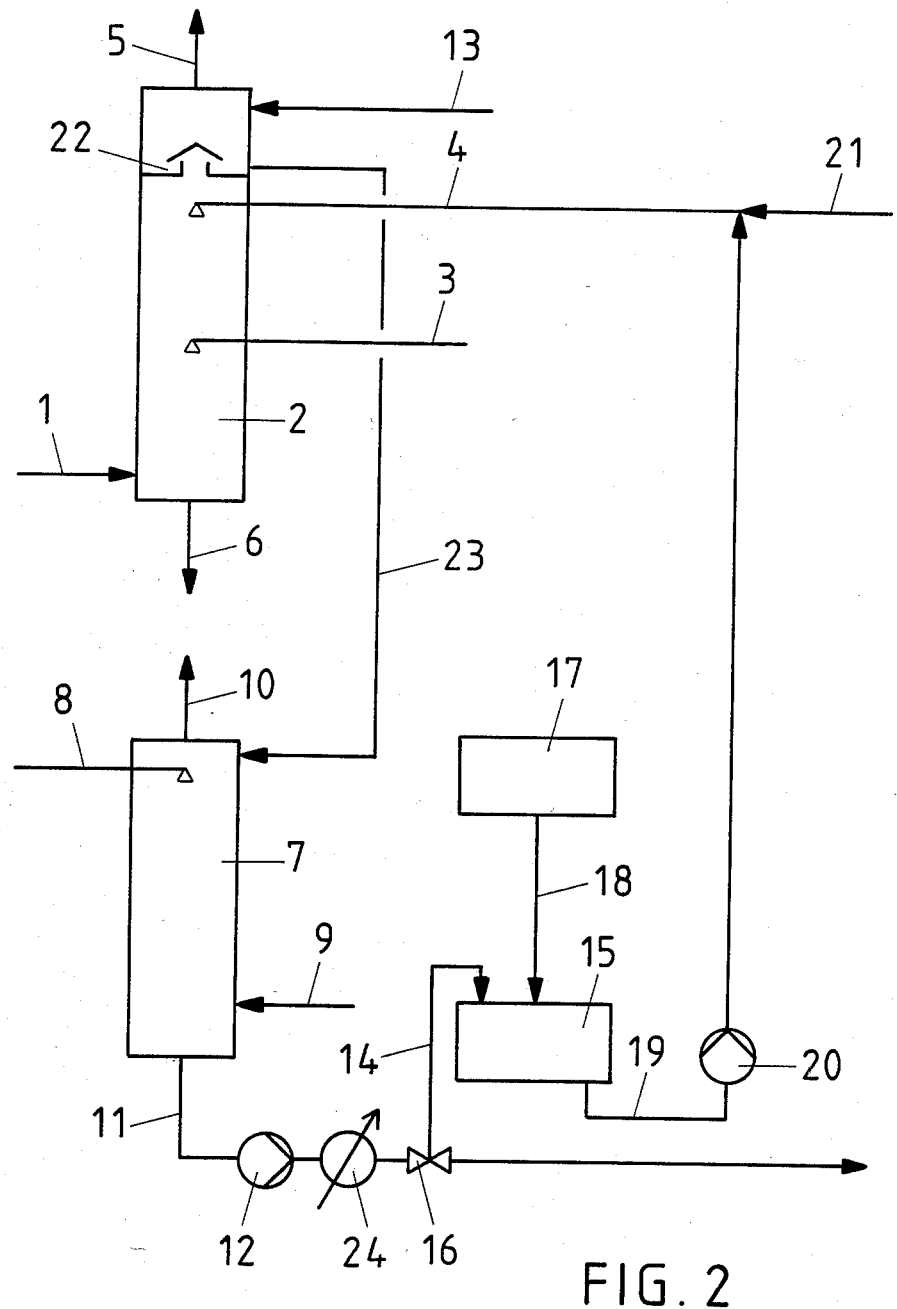
FIG. 2 is a diagram illustrating the inventive method, in which the required caustic soda solution is supplied to an ammonia washer.

The flow diagrams of FIGS. 1 and 2 show only those parts of the process, that pertain to the present invention whereas the commonly known devices, in which coking gas is processed before it enters the units shown in the drawings and after it leaves the washing units for further processing, are not shown in the drawings and not discussed herein.

Referring now to the drawings in detail, and first to FIG. 1, the flow diagram shown in this figure serves to illustrate an example, in which a coking oven gas should be processed with the speed 70,000 $m_n^3$ per hour. This gas, which contains, after a respective precooling, from 5.6 g/1000 $m_n^3$ of ammonia gas and which has a temperature of 26° C., is fed via a conduit 1 to an ammonia washer or scrubber 2. The ammonia washer used in this method can be of a commonly known construction with suitable units normally utilized for processing coking oven gas. It is understood than in practice more than two washing stages can be carried out.

In the exemplified embodiment, water enriched with ammonia is fed through a conduit 3 to the ammonia washer 2 in the first washing stage. Therefore, the condenser and cooler condensate is obtained, which altogether contains 8.75 g/l of ammonia. At the second and here the last stage of washing of the coking oven gas, a neutralized waste water in the amount of 0.5 m³ per 1000 $m_n^3$ of gas is fed to the ammonia washer 2 from an ammonia decanter or still 7 via conduit 4. Ammonia contained in gas is thereby washed unless the residual content is about 0.1 g of $NH_3$ per 1000 $m_n^3$. The gas with such a residual content is discharged via a conduit 5 from ammonia washer 2 and supplied to the other gas processing units not shown herein. The washing water flowing through the ammonia washer 2 is collected in a sump located at the bottom of washer 2 and is removed therefrom via a conduit 6.

This ammonia-carrying washing water is supplied to the ammonia still 7 through a conduit 8. Ammonia contained in that water is decanted in ammonia still 7. Water steam required for this process is injected into ammonia still 7 through a conduit 9. It is to be noted that ammonia still 7 can be also of any known suitable construction and is therefore not described herein in detail. Ammonia vapor formed in the ammonia still is removed from the latter via a conduit 10 and is supplied thereafter to suitable units for further processing whereas waste water flowing through the ammonia still 7 and having the temperature of 113° C. is discharged from ammonia still 7 via conduit 11. This waste water should, before entering the main canal, be subjected to the biological cleaning. This waste water is then pumped through pump 12, heat exchanger 24 and then to a waste water cleaning installation not shown in the drawing. In the heat exchanger 24 the waste water is cooled down to 25°–30° C., as required for the biological waste water cleaning.

The caustic soda solution required for freeing ammonia from gas is supplied to the ammonia still 7 via conduit 13. A portion of the waste water, still containing 0.5 m³ per 1000 $m_n^3$ of gas, that leaves the ammonia still 7 through conduit 11, is branched off from the remaining waste water and is supplied through a conduit 14 into a dosing tank 15. Valve 16 serves for adjusting that portion of the waste water stream. The waste water also contains about 100 mg/l of free ammonia which must be further neutralized. For this purpose a required quantity of sulfuric acid is supplied via a conduit 18 to the dosing tank 15 from a supply tank 17. The ammonia sulfate formed during the neutralization of free ammonia in waste water remains solved in the waste water partial stream which is removed from the dosing tank 15 through a conduit 19 and pumped by a pump 20 towards the conduit 4 through which this waste water partial stream is fed into the ammonia washer 2. Fresh water, which has been eventually softened, can be supplied via a conduit 21 to the ammonia washer 2 if any disturbances occur in the waste water recycling process for some reasons.

With reference to FIG. 2 it will be seen that the flow diagram of FIG. 2 differs from the flow diagram of FIG. 1 in that the caustic soda solution supplied through conduit 13 is fed not to the head of the ammonia still 7 but to the head of ammonia washer 2. The latter in this case is so constructed that a gas-permeable but liquid-non-permeable plate or distilling column 22 is mounted within the ammonia washer 2 above the inlet of the conduit 4. The caustic soda solution fed into the ammonia washer 2 through conduit 13 thus reacts with gas in the upper portion of the ammonia washer 2 at least partially with the following formation of sodium sulfide and sodium carbonate. An alkaline solution collected in the plate 22 is removed from the ammonia washer through a conduit 23 from which it is fed to the head of ammonia still 7 in which the alkaline solution serves for decomposition of ammonia bound in the coking oven gas. All the remaining portions of the diagram of FIG. 2 correspond to those of the diagram depicted in FIG. 1 and are designated by the same reference numerals. Thus the waste water recycling process according to FIG. 2 is similar to that explained herein above for FIG. 1. Due to the feeding of the caustic soda solution into ammonia washer 2 an additional washing out of acid constituents, particularly hydrogen sulfide from coking oven gas, is achieved.

It will be understood that each of the elements described above, or two or more together, may also find a useful application in other types of methods of the removal of ammonia from coking oven gas differing from the types described above.

While the invention has been illustrated and described as embodied in a method of washing out of ammonia from coking oven gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a multi-stage method for washing out amonia from gas, particularly coking oven gas, including the steps of washing out ammonia from gas with water enriched with ammonia in an ammonia washer at at least one wash stage and washing-out ammonia from the gas with ammonia-free water at a final wash stage in the ammonia washer, providing an ammonia still and supplying an ammonia-containing water produced at said at least one wash stage in said ammonia washer to said ammonia still, separating ammonia vapor from waste water in said ammonia still under the action of water steam supplied to said ammonia still, and discharging waste water from said ammonia still, the improvement comprising the steps of branching off a partial stream of waste water from the waste water discharged from said ammonia still and supplying said partial stream directly to said final wash stage of said ammonia washer, said partial stream containing about 100 mg/l of free ammonia, before being supplied to said ammonia washer, being neutralized by the addition thereto of sulfuric acid.

2. The method as defined in claim 1, wherein ammonia salts formed in said ammonia still in said separating step are disintegrated.

3. The method as defined in claim 1, wherein 0.2 to 0.6 m$^3$ of neutralized waste water per 1000 m$^3_n$ of gas is supplied to said ammonia washer in said supplying step.

4. The method as defined in claim 2, wherein the ammonia salts are formed during said neutralization, and a disintegration of the ammonia salts is carried out in said ammonia washer by feeding caustic soda solution to the gas being processed in said ammonia washer.

5. The method as defined in claim 4, wherein said caustic soda solution is supplied to a head of the ammonia washer above an inlet for said partial stream, then removed from said ammonia washer and fed to said ammonia still.

* * * * *